April 23, 1929.  O. E. MAIN ET AL  1,710,632
COMBINED HAY RAKE, STACKER, AND LOADER
Filed Jan. 11, 1927  4 Sheets-Sheet 1
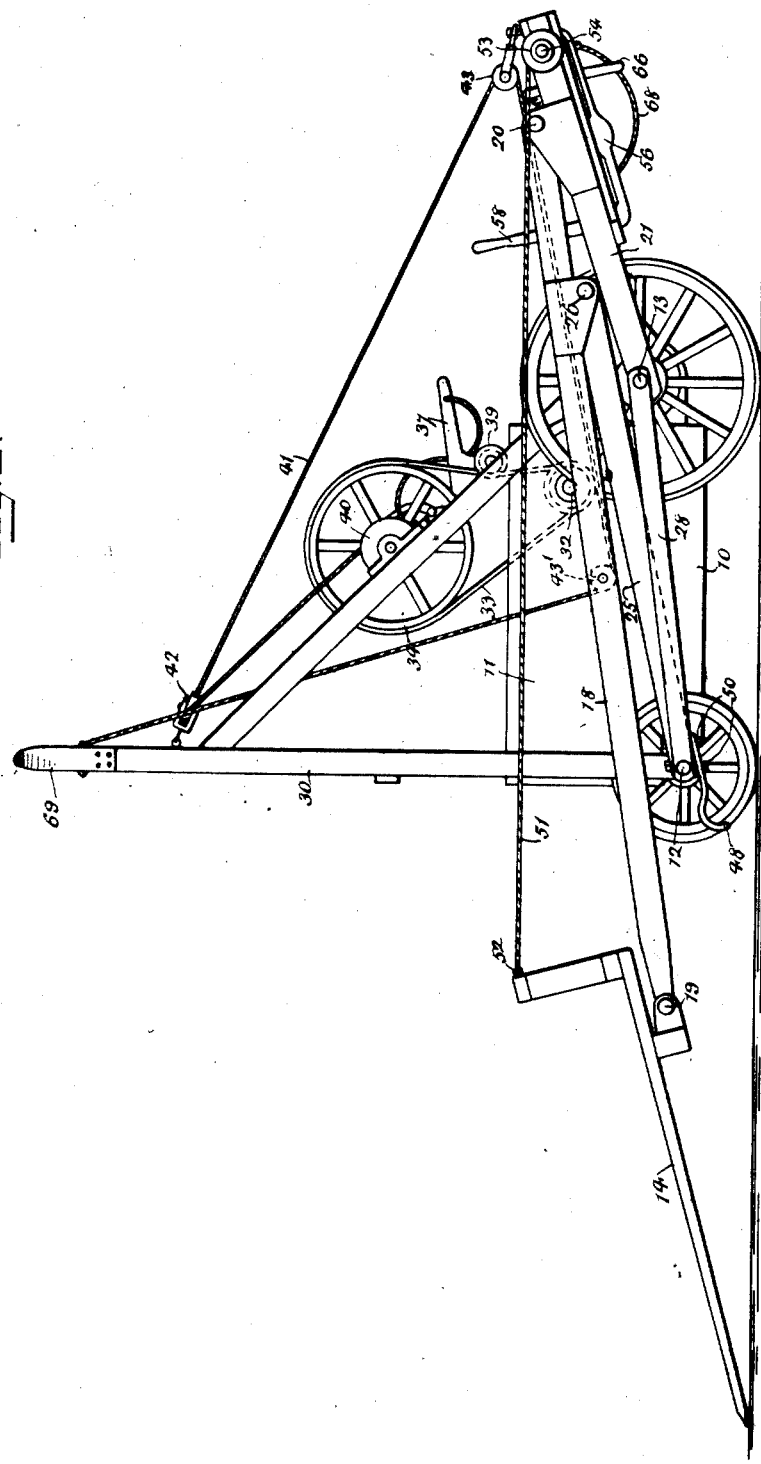
WITNESSES
H. J. Walker
Chris Feinle
INVENTOR
O. E. Main
C. C. Wanghop
BY
ATTORNEY

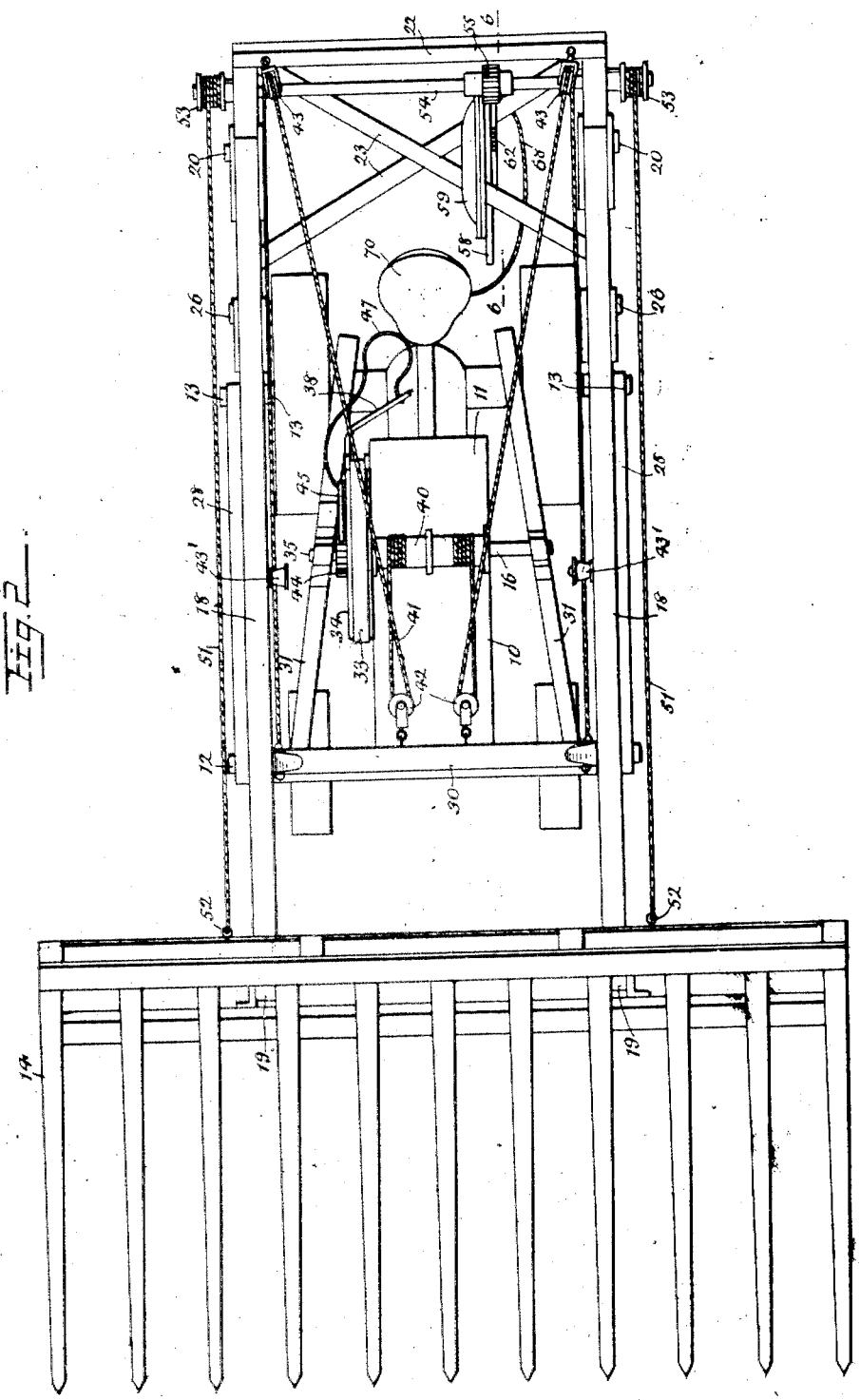

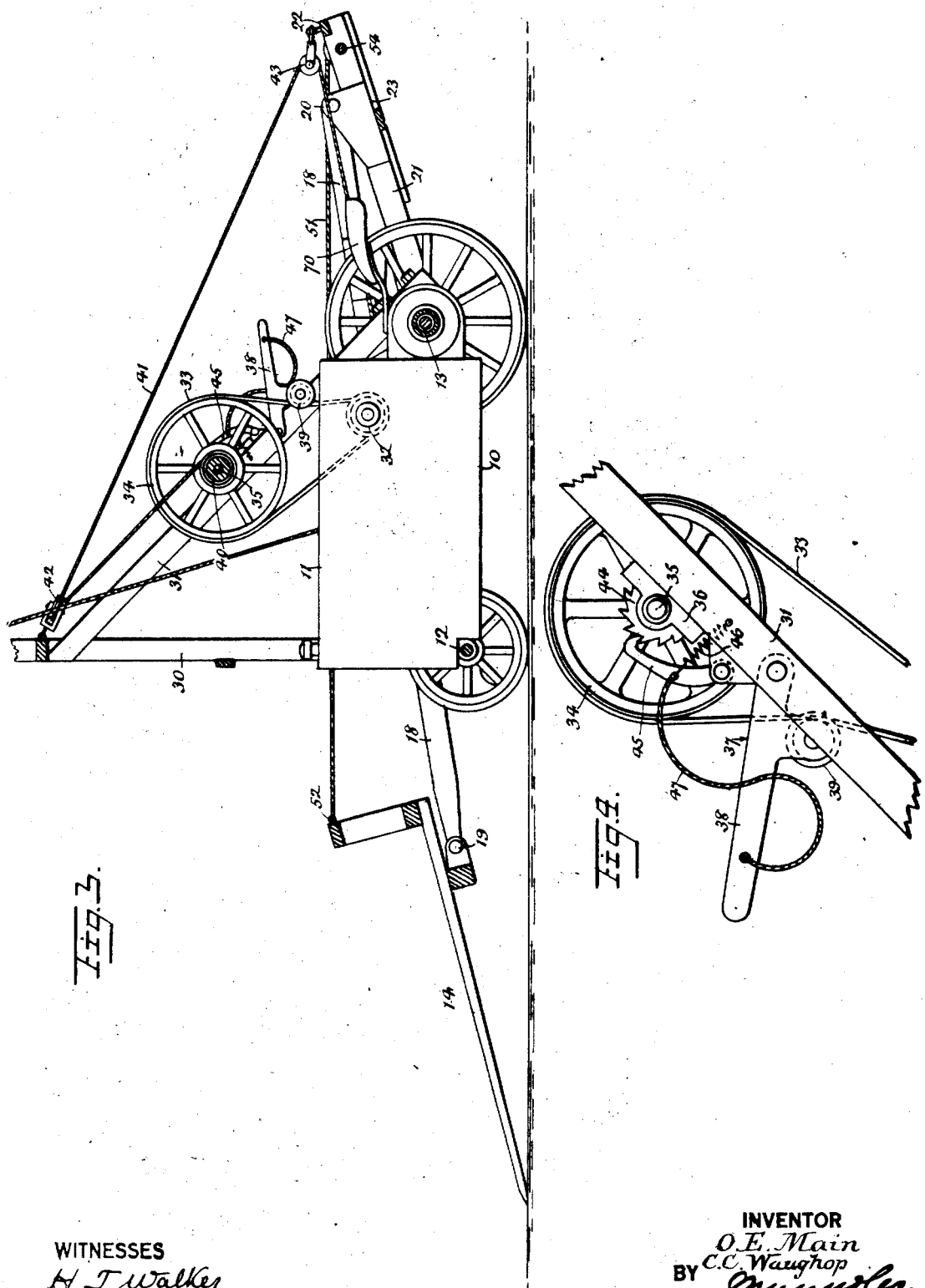

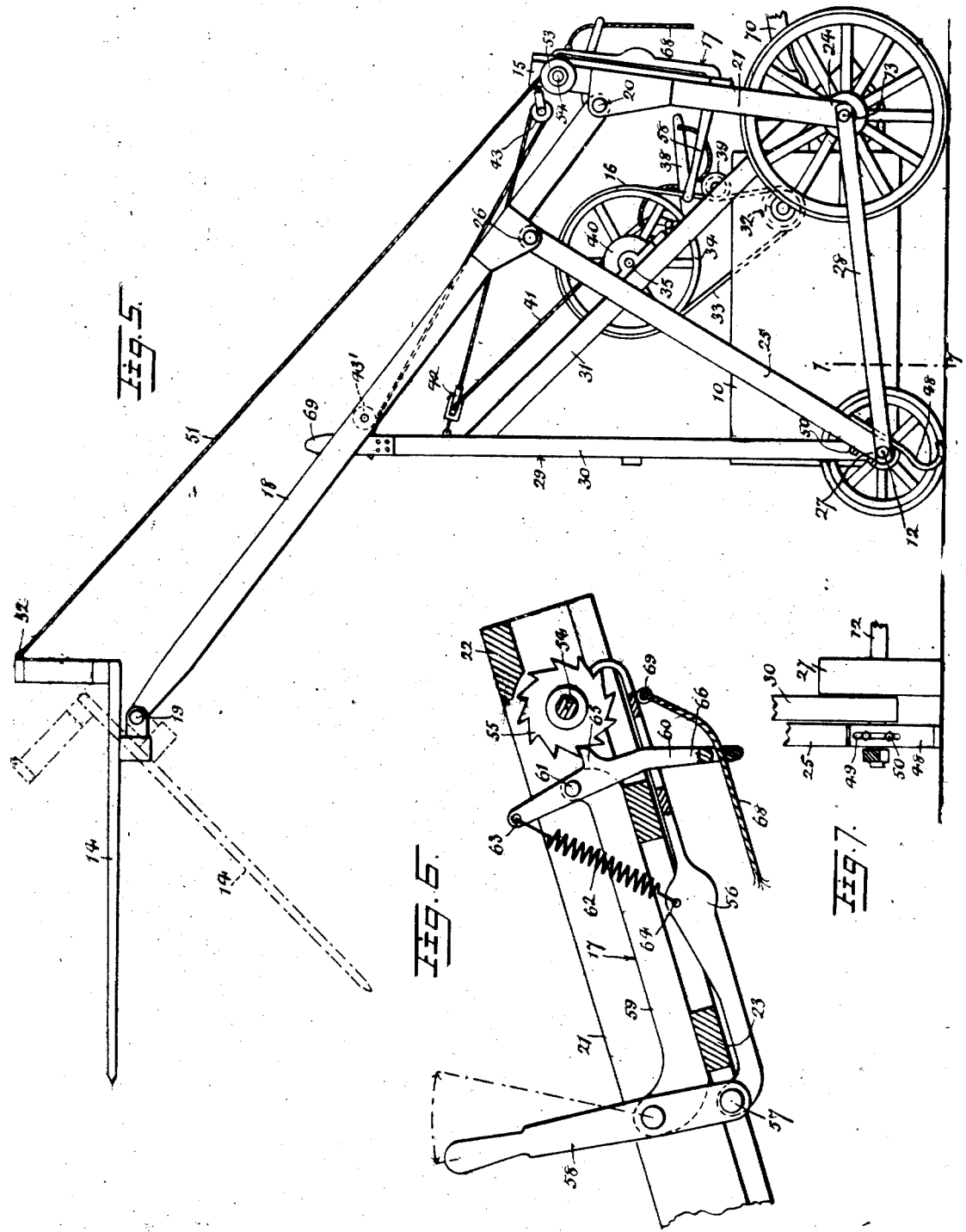

Patented Apr. 23, 1929.

1,710,632

UNITED STATES PATENT OFFICE.

OTHA EARL MAIN AND CLARENCE C. WAUGHOP, OF OSKALOOSA, IOWA.

COMBINED HAY RAKE, STACKER, AND LOADER.

Application filed January 11, 1927. Serial No. 160,428.

This invention relates to an apparatus in the form of an attachment for tractors or other similar power driven vehicles, by means of which hay, alfalfa or other grass cut for feed may be raked and lifted to be dumped into a wagon or for stacking the same.

The principal object of the present invention is the provision of an apparatus of the indicated character which is operable by the power derived from the power plant of the vehicle on which it is mounted for lifting the hay and other materials, and which is manually operable for dumping the hay or other materials to accomplish the wagon loading or stacking operations.

Another object of the present invention is the provision of an apparatus of the indicated character which will be more efficient as regards construction for sustaining the weight of the loads during the lifting and dumping thereof, and which will be more thoroughly effectual in carrying out the raking, lifting and dumping operations.

With the foregoing and other objects in view the invention resides in the particular combination, relative disposition and functions of the parts hereinafter fully described and illustrated in the accompanying drawings, in which—

Figure 1 is a side elevation of a power driven vehicle in the form of a tractor to which the apparatus of the present invention is operatively attached.

Fig. 2 is a plan view.

Fig. 3 is a vertical and longitudinal sectional elevation.

Fig. 4 is an elevation on an enlarged scale of the means for controlling the raising and lowering of the rake.

Fig. 5 is a side elevation illustrating the rake in its elevated position, the rake being shown in dumping position in dotted lines.

Fig. 6 is a sectional elevation, the section being taken on the line 6—6 of Fig. 2, and illustrating certain features of the manually operable means for adjusting the rake and for moving it to the raking and dumping positions.

Fig. 7 is a detail sectional view of one of the shoes employed for taking up some of the weight off the front axles of the tractor, and to prevent tipping sidewise.

In practice, the apparatus of the present invention will essentially involve the use of a tractor or other power driven vehicle, designated 10, having an engine 11, a front road wheel axle 12 and a rear road wheel axle 13.

The apparatus of the present invention generally stated consists of a rake 14, means 15 connected to the rake and operable for moving it to a raking position and for elevating the rake for the dumping operations, means 16 operatively connected with the engine 11 for operating the means 15, and means 17 for effecting the movement of the rake 14 to either adjust the same for proper raking action, or for dumping the load carried by the rake.

The rake 14 may be of any preferred construction and of any preferred size. The means 15 hereinbefore referred to operable for raising and lowering the rake, in the present instance includes beams 18 each of which is pivotally connected as at 19 to the under side of the rake near the back thereof, and each of the frame beams 18 is also pivotally connected at its opposite end as at 20 to a frame beam 21. The frame beams 21 are connected together by a transverse beam 22, and are also connected together by suitable diagonal braces 23. Each frame beam 21 is pivotally connected as at 24 to the rear road wheel axle 13, the said end of the axle serving as a fulcrum. Fulcrum beams 25 are provided, these being connected between each beam 18 and one end of the front road wheel axle 12. Each fulcrum beam 25 is connected for pivotal movement to its related beam 18, as at 26, and is connected to the end of the axle for pivotal movement as at 27. A beam 28 is connected between the ends of the axles 12 and 13 at each side of the tractor 10 to give rigidity and to hold the beams 21 and 25 in place.

The means 16 hereinbefore referred to connected to the engine 11 for controlling the operation, or in other words for raising and lowering the rake 14, is supported by a suitable frame structure 29. The frame structure 29 consists of an upright section 30 supported from the front axle 12, and brace beams 31 secured to the section 30 and connected to the rear axle 13. The said means 16 includes a pulley 32 which will be operatively connected to some driven part of the engine 11. A belt 33 passes around the pulley 32 and around a large pulley 34 connected to a shaft 35 mounted for rotation in bearings 36 attached respectively to the beams 31. A belt tightener 37 is employed for tightening the belt 33 so that rotational movement of the pulley 32 will be transmitted to the pulley 34. The tightener consists of a lever 38 which carries a roller 39. The roller under the influence of pressure applied to the lever 38 transmits the pressure to one lead of the belt 33 and in that way the tightening action is set up. When the pressure is removed, the pulley 34 will remain stationary. Arranged on the shaft 35 is a drum 40 which rotates with the shaft 35. Cables 41 are employed. Each cable 41 has one end attached to the drum 40 and encircles or passes around a sheave 42 attached to the cross bar of the upright section 30, a sheave 43 attached to the transverse beam 22 and a sheave 43' attached to one of the beams 18. The remaining end of each cable 41 is attached to the cross bar of the section 30. It will now be understood that when the pulley 34 is in motion, through and by virtue of the intervention of the shaft 35, drum 40, cables 41 and sheaves 42, 43 and 43', the means 15 may be operated to raise the rake 14. In order to hold the rake 14 in the raised position there is provided on the shaft 35 a ratchet wheel 44 with which a pivoted dog 45 coacts. The dog 45 is under the influence of a spring 46 having one end thereof connected to the dog and the opposite end connected to the adjacent brace beam 31. The spring 46 serves to normally and releasably hold the dog 45 in coacting engagement with one of the teeth of the ratchet wheel 44. A suitable pull cord 47 is employed with one end connected to the dog 45 and the other end connected to the lever 38. By exerting a pull on the cord 47, the dog 45 will be disengaged, and as a consequence the rake 14 will be allowed to move downwardly under its own weight and the weight of the parts connected thereto.

In order to assist in supporting the weight falling upon the front axle 12, there are provided feet 48 which are detachably connected respectively to the fulcrum beams 25. Each of the feet 48 has a slot 49 which accommodates fastening elements such as the bolts 50 which extend transversely through the related beam 25 as shown most clearly in Fig. 7. The feet 48 engage the ground when the rake 14 is elevated and in that way aid in supporting the weight falling upon the axle 12. The feet 48 also act to prevent lateral swaying of the means 15 when the rake is elevated.

The means 17 hereinbefore referred to for adjusting and for tilting the rake 14, in the present form, advantageously, may consist of a pair of cables 51, each of which is attached as at 52 to the back of the rake 14 at one end, and the opposite end thereof is secured to a small drum 53 around which the opposite end of the cable 51 is adapted to be wound and from which it may be unwound. The drums 53 are made fast on a shaft 54 supported for rotation in suitable bearings respectively in the ends of the frame beams 21. A ratchet wheel 55 is secured to the shaft 54. Movement is imparted to the ratchet wheel 55, and therefore shaft 54 by virtue of a pawl 56 pivotally connected as at 57 to a hand lever 58 carried by a fixture 59 carried by the braces 23. A dog 60 is employed to coact with the ratchet wheel 55 to prevent unintentional rotation of the shaft 54 in one direction. The dog 60 is pivoted as at 61 to the fixture 59. A spring 62 is employed between the pawl 56 and the dog 60. The spring 62 has one end thereof connected to one extremity of the dog 60 as at 63, whereas, the opposite end of the spring 62 is connected as at 64 to the pawl 56. The spring 62 serves the double purpose of releasably maintaining the coaction of the tooth 65 of the dog in coacting relationship with respect to the teeth of the ratchet wheel 55, and maintains the coacting relationship of the pawl 56 with respect to the teeth of the ratchet wheel 55. The tail 66 of the dog 60 extends through a slot in the pawl 56, and said tail 66 has a hole 67 therein through which a pull cord 68 passes. The pull cord 68 has one end thereof attached as at 69 to the pawl 56 and the opposite end thereof is secured at a convenient point within reach of the operator, near the seat 70 of the tractor. By manipulating the lever 58, the pawl 56 may be reciprocated causing rotation of the ratchet wheel 55, shaft 54, and drums 53. As a result the cables 51 will be wound respectively on the drums 53 causing the rake 14 to move upwardly. The dog 60 serves to hold the rake 14 in the desired position to which it is moved by manipulating the lever 58. By pulling on the cord 68, the pawl 56 will be moved on its pivot 57, against the action of the spring 62, to an inactive position, and at the same time the dog 60 will be moved on its pivot 61 to an inactive position with its tooth 65 out of the path of the teeth of the ratchet wheel 55. The dog 60 is moved to the inactive position by virtue of the action of the cord 68 on the tail 66 of the dog 60. At this time the dog will be under the influence of a reverse pull exerted by the spring 62. The rake 14 may then tilt downwardly to the desired angle of inclination, due to the fact that the shaft 54 and drums 53 are free to rotate. By releasing the pull on the cord 68 the tooth 65 of the dog will automatically be brought into engagement with one of the teeth of the ratchet wheel 55 to prevent further rotation of the shaft 54 and drums 53, and at the same time the pawl 56 will be returned to an active position, in response to the action of the spring 62. It will also be understood that the means 17 serves for adjusting the rake 14 to any desired inclination for the raking action, when the rake 14 is lowered. Curved guide members 69 attached respectively at opposite sides to the upper end of frame section 30 insure the proper lowering of the rake beams 18.

It is to be understood that the invention is not restricted to the precise arrangement of parts shown and described, as details of construction may be modified and rearranged without departing from the spirit of the invention, the scope of which is limited only by the terms of the appended claims. For example, it is not necessary that any of the beams be mounted on or connected directly with any of the axles, providing the general arrangement of the beams on the frame be such as that herein explained. An auxiliary frame may be provided with which the arrangement of beams may be connected so that the apparatus may be used as an accessory in connection with practically any tractor by mounting such frame on the tractor.

We claim:

1. The combination with a power driven vehicle including front and rear road wheel axles; of a rake, rake beams pivotally connected with said rake, front and rear pairs of beams fulcrumed on said axles respectively and pivotally connected with said rake beams, means operated by the engine of the vehicle and connected with said rake beams and the rear pair of beams to impart movement to all of the beams to elevate the rake, means for holding the beams against movement when the rake is elevated and releasable to permit the rake with the beams to lower under the weight thereof, and means for tilting the rake.

2. The combination of a power driven vehicle having a frame, with a beam structure pivoted on the frame near its rear end, a second longer beam structure pivoted on the frame forwardly of the first beam structure, a supporting beam structure having one end pivoted to the first and second beam structures at their ends opposite their connections with the frame, an article handling means connected with the supporting beam structures, pulleys on the first beam structure, and pulleys on the supporting beam structure between its free end and its points of connection with the first and second beam structures, a cable secured to the upper part of said frame and extended around said pulleys, and means for drawing said cable for raising the beam structures.

3. In a device of the class described, a frame, a beam structure pivoted on said frame, an article handling member pivoted to the free end of the beam structure and provided with an offset element adjacent its pivot means, a cable secured at one end to said offset element, a drum suitably mounted adjacent the pivoted end of the beam structure, the end of the cable remote from that secured to said offset element being wrapped on said drum, a ratchet fixed with relation to said drum, a pair of coacting pawls for said ratchet, a lever connected with one of said pawls to operate the ratchet to turn said drum to wind the cable thereon for the purpose of swinging the article handling member upwardly on its pivot means, and flexible means for actuating both pawls from a distance to release the ratchet so that the drum may turn to allow the cable to unwind for the purpose of swinging the article handling member downwardly on its pivot means.

OTHA EARL MAIN.
CLARENCE C. WAUGHOP.